(12) United States Patent
Dong et al.

(10) Patent No.: US 6,705,211 B2
(45) Date of Patent: Mar. 16, 2004

(54) ELECTRIC ROASTER FOR SMOKED MEAT

(75) Inventors: Shou-Cai Dong, Nanhai (CN); Li Huang, Nanhai (CN)

(73) Assignee: Wei-Wen Jian, Nanhai (CN)

( * ) Notice: Subject to any disclaimer, the term of this patent is extended or adjusted under 35 U.S.C. 154(b) by 29 days.

(21) Appl. No.: 10/137,533

(22) Filed: May 2, 2002

(65) Prior Publication Data
US 2003/0140801 A1 Jul. 31, 2003

(30) Foreign Application Priority Data
Jan. 28, 2002 (CN) ........................... 02225418 U

(51) Int. Cl.⁷ ............... A47J 37/12; A23B 4/03
(52) U.S. Cl. ............... 99/415; 99/418; 99/482; 99/449; 219/432
(58) Field of Search ............... 99/418, 415, 467, 99/481, 482, 449, 426; 219/429, 432, 438, 428; 126/275 R

(56) References Cited

U.S. PATENT DOCUMENTS

| 2,364,537 A | * | 12/1944 | Kerth | ............ 99/418 |
| 3,830,148 A | * | 8/1974 | Shevlin | ............ 219/432 X |
| 6,274,847 B1 | * | 8/2001 | Hlava et al. | ............ 219/433 |

FOREIGN PATENT DOCUMENTS

GB 2120578 * 12/1983 ............ 99/418

* cited by examiner

Primary Examiner—Reginald L. Alexander
(74) Attorney, Agent, or Firm—Shen & Li Patent Services

(57) ABSTRACT

Disclosed herein is an electric roaster for smoked meat which comprises an outer shell, an inner pan covered by heating elements located inside the outer shell, an up lid, a supporting ring located on the bottom of the inner pan, a tray for holding the meat located within the inner pan.

7 Claims, 1 Drawing Sheet

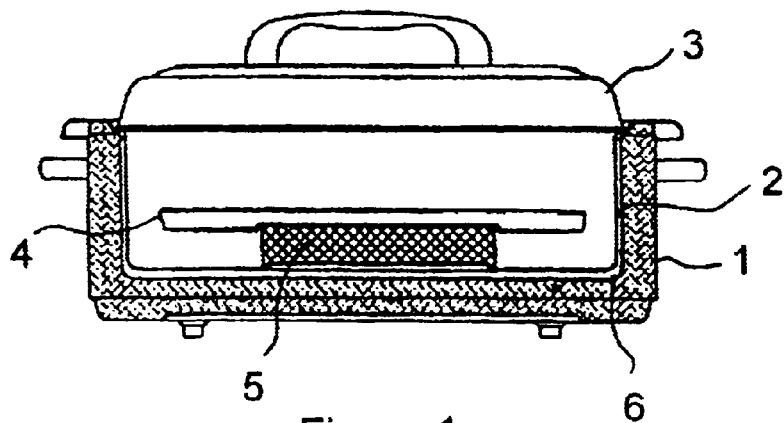
Figure 1
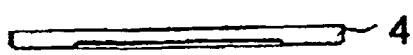
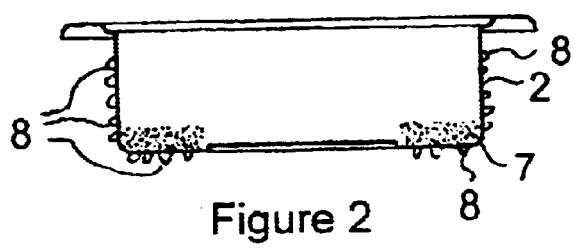
Figure 2
Figure 3
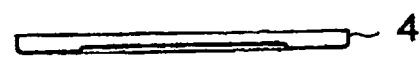
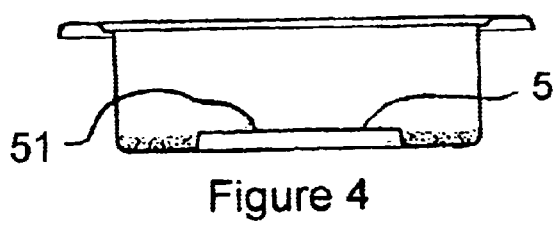
Figure 4
Figure 5
Figure 6
Figure 7

ELECTRIC ROASTER FOR SMOKED MEAT

Pursuant to 35 U.S.C. §119(d) the present application claims priority to China patent application Serial No. 02225418.8, filed Jan. 28, 2002, which is incorporated by reference herein.

BACKGROUND OF THE INVENTION

A. Field of the Invention

The present invention relates to a roaster for roasting meat or a roaster with a spraying device for roasting meat; more particularly, to an electric roaster for smoked meat.

B. Description of the Prior Art

In general, the process for producing smoked meat includes two steps, that is, roasting and smoking. In the roasters of the prior art, only the process for roasting meat is provided. However, no smoking function is provided in the prior art roasters.

SUMMARY OF THE INVENTION

To overcome the above problem of the prior art, the present invention provides an electric roaster for smoked meat which not only has the function of roasting meat, but also provides the function of smoking meat during the roasting.

According to the present invention, there is provided an electric roaster for smoked meat including: an outer shell; an inner pan, covered by heating elements; and an up lid. The electric roaster for smoked meat of the present invention is characterized in that said electric roaster further includes: a tray for containing the meat roasted, a supporting ring, some wood material for producing smoke and an outer pan, wherein said supporting ring is disposed on the bottom of said inner pan; said tray is disposed on said supporting ring; said up lid is disposed on the top of said inner pan; said outer pan is disposed outside said inner pan within said outer shell; and some wood material for producing smoke is put around said supporting ring.

According to a first aspect of the present invention, said inner pan, said tray and said supporting ring are formed to be separate units.

According to a second aspect of the present invention, said supporting ring and the bottom of said inner pan are integrally formed, that is, the bottom of said inner pan has a convex annular platform projected at its center portion with a closed top surface on which said tray is placed.

According to a third aspect of the present invention, the top of said supporting ring and the back of said tray are integrally formed, so that the ring can be taken out along with said tray.

Preferably, said supporting ring is formed to be an oblate a short sleeve with a side wall of mesh structure and an upper and a lower open ends; and said supporting ring is provided between said tray and said inner pan and above the bottom of said inner pan, with its diameter being smaller than those of both said tray and said bottom.

Preferably, said tray is provided with a periphery warped upward.

BRIEF DESCRIPTION OF THE DRAWINGS

FIG. 1 is a schematic sectional view of the structure of a first embodiment of the present invention;

FIG. 2 is a schematic exploded sectional view of the parts in the inner pan according to the first embodiment of the present invention;

FIG. 3 is a schematic view of the structure in the inner pan during its operation according to the first embodiment of the present invention;

FIG. 4 is a schematic exploded sectional view of the parts in the inner pan according to a second embodiment of the present invention;

FIG. 5 is a schematic sectional view of the structure in the inner pan during its operation according to the second embodiment of the present invention;

FIG. 6 is a schematic exploded sectional view of the parts in the inner pan according to the third embodiment of the present invention; and FIG. 7 is a schematic sectional view of the structure in the inner pan during its operation according to the third embodiment of the present invention.

In all the drawings, the main parts and its reference numerals are as follows:

The outer shell 1, the inner pan 2, the up lid 3, the tray 4 for containing meat roasted, the supporting ring 5, the outer pan 6, the wood material 7 for producing smoke, and heating elements 8 covering the outer surface of the inner pan 2.

DESCRIPTION OF THE PREFERRED EMBODIMENTS

Referring now to FIG. 1, FIG. 2 and FIG. 3, which show the first embodiment of the present invention, the electric roaster for smoked meat according to the present invention includes: an outer shell 1, an inner pan 2, an up lid 3, a tray 4 for containing the meat roasted, a supporting ring 5, some wood material 7 for producing smoke and an outer pan 6. The inner pan 2, the tray 3 and the supporting ring 5 are formed to be separated units, so that they can be taken out or put into said electric roaster separately. The outer surface of the inner pan is covered by heating elements 8, preferably, by electric heating elements. The up lid 3 is disposed on the top of the inner pan 2. The outer pan 6 is located outside the inner pan 2 and within the outer shell 1. The supporting ring 5 is formed to be an oblate short sleeve with a side wall of mesh structure and an upper and a lower open ends, and mounted between the inner pan 2 and the tray 4 and above the bottom of the inner pan 2, having a diameter smaller than those of the tray 4 and the bottom of the inner pan 2. The tray 4 with its periphery warped upward is movably positioned inside the inner pan 2. And, the wood material 7 for producing smoke is put around the supporting ring 5.

Referring to FIG. 4 and FIG. 5, which show the second embodiment of the present invention, the supporting ring 5 and the bottom of the inner pan 2 are integrally formed. In other words, the supporting ring 5 is unitary with the bottom of the inner pan 2. Preferably, the bottom of the inner pan 2 has a convex annular platform 51 projected from the central portion thereof. The top of the platform 51 is a closed surface and the tray 4 is put on it. The platform 51, for example, can be formed by stamping during the process of manufacturing the roaster. The other parts of the structure of the second embodiment are as same as those of the first embodiment.

See the FIG. 6 and FIG. 7, which show the third embodiment of the present invention. The structure of the third embodiment is as same as that of the first embodiment except for that the top of the supporting ring 5 and the back of the tray 4 are integrally formed, so that the supporting ring 5 can be taken out along with the tray 4. In another word, the supporting ring 5 is unitary with the tray 4.

The method of using the electric roaster of the present invention to smoke meat will now be described below.

First, some wood material 7 for producing smoke is put into the inner pan 2 around the supporting ring 5 under the tray 4. Then, the food to be roasted is placed onto the tray 4 and then the roaster is closed by up lid 3, before the heating elements are energized. Smoke is produced from the wood material 7 under the high temperature during the meat roasting so as to smoke the meat. And, the oil and other liquids escaped from the meat roasted can be accumulated in the tray 4 to prevent the wood material 7, which is put under the tray 4, from catching fire due to the oil contacting with it.

Compared with the roaster of the prior art, the electric roaster for smoked meat according to the present invention has substantial advantages and effects. As shown in the above embodiments, the electric roaster for smoked meat according to the present invention can provide a smoking process for the food being roasted. In addition, the tray for containing the food roasted can accumulate the oil produced during the roasting to prevent the wood material for producing smoke from catching fire. Furthermore, the structure of the electric roaster for smoked meat of the present invention is simple and the electric roaster is easy to operate.

The above description discloses the preferable embodiments, but is not intended to limit the scope of the present invention. The present invention will embrace all of the modifications and changes which are made upon the above embodiments without departing from the spirit and scope of the present invention.

We claim:

1. An electric roaster for smoked meat, comprising: an outer shell; an inner pan covered by heating elements located inside said outer shell, an up lid together with said inner pan to form an enclosure, a supporting ring located on a bottom of said inner pan; a tray for holding the meat located within said inner pan and supported by said supporting ring, whereby wood material is placed around said supporting ring on the bottom of said inner pan to produce smoke during an operation of said electric roaster, wherein said supporting ring comprises an oblate short sleeve having a side wall of mesh structure, and an upper and a lower open ends; and said supporting ring is located between said tray and said inner pan, said supporting ring having a diameter smaller than diameters of both said tray and said inner pan.

2. The electric roaster of claim 1, wherein said inner pan, said tray and said supporting ring are separate units.

3. The electric roaster of claim 1, wherein said tray comprises a periphery warped upward.

4. The electric roaster of claim 1, wherein said supporting ring is unitary with the bottom of said inner pan.

5. The electric roaster of claim 1, wherein said supporting ring is unitary with said tray.

6. The electric roaster of claim 5, wherein said tray comprises a periphery warped upward.

7. An electric roaster for smoked meat, comprising: an outer shell; an inner pan covered by heating elements located inside said outer shell; an up lid together with said inner pan to form an enclosure; a supporting ring located on a bottom of said inner pan; a tray for holding the meat located within said inner pan and supported by said supporting ring, whereby wood material is placed around said supporting ring on the bottom of said inner pan to produce smoke during an operation of said electric roaster, said supporting ring is unitary with the bottom of said inner pan, and the bottom of said inner pan further comprises a convex annular platform projected at a center portion to form said supporting ring, whereby said tray is placed on said platform.

* * * * *